United States Patent
Galbreath et al.

(10) Patent No.: US 8,696,067 B2
(45) Date of Patent: Apr. 15, 2014

(54) VEHICLE SEATING FRAME, ASSEMBLY, AND METHOD OF MAKING

(75) Inventors: Ashford A. Galbreath, Troy, MI (US); Asad S. Ali, Troy, MI (US); Gary Rock, Canton, MI (US)

(73) Assignee: Lear Corporation, Southfield, MI (US)

( * ) Notice: Subject to any disclaimer, the term of this patent is extended or adjusted under 35 U.S.C. 154(b) by 342 days.

(21) Appl. No.: 12/509,713

(22) Filed: Jul. 27, 2009

(65) Prior Publication Data
US 2011/0018329 A1  Jan. 27, 2011

(51) Int. Cl.
*A47C 7/02* (2006.01)

(52) U.S. Cl.
USPC ............... 297/452.1; 297/452.27; 297/463.1; 297/DIG. 1

(58) Field of Classification Search
USPC ............... 297/452.18, 452.21, 452.1, 463.1, 297/452.26, 452.27, DIG. 1, DIG. 2
See application file for complete search history.

(56) References Cited

U.S. PATENT DOCUMENTS

| | | | |
|---|---|---|---|
| 3,313,571 A | 4/1967 | Farrera | |
| 3,574,401 A | 4/1971 | Lehner | |
| 3,594,041 A | 7/1971 | Rye | |
| 3,833,259 A * | 9/1974 | Pershing | 297/452.27 |
| 3,904,243 A | 9/1975 | Kostelec et al. | |
| 4,573,741 A * | 3/1986 | Kirchner-Carl | 297/452.18 |
| 4,755,411 A | 7/1988 | Wing et al. | |
| 4,837,881 A * | 6/1989 | Kondo et al. | 5/653 |
| 4,852,228 A | 8/1989 | Zeilinger | |
| 4,861,104 A | 8/1989 | Malak | |
| 5,176,860 A | 1/1993 | Storch | |
| 5,252,270 A | 10/1993 | Haardt et al. | |
| 5,522,645 A * | 6/1996 | Dahlbacka | 297/452.55 |
| 5,542,747 A * | 8/1996 | Burchi | 297/452.55 |
| 5,786,394 A | 7/1998 | Slaven | |
| 5,882,073 A | 3/1999 | Burchi et al. | |
| 5,967,604 A | 10/1999 | Yoshida et al. | |
| 5,971,478 A | 10/1999 | Hurite | |
| 6,406,093 B1 | 6/2002 | Miotto et al. | |
| 6,609,745 B2 | 8/2003 | Miyahara et al. | |

(Continued)

FOREIGN PATENT DOCUMENTS

| | | |
|---|---|---|
| DE | 1680264 A1 | 4/1972 |
| DE | 2117153 A1 | 10/1972 |

(Continued)

OTHER PUBLICATIONS

German Office Action Dated Mar. 2, 2012, Application No. 10 2010 028 554.4, Applicant Lear Corporation.

*Primary Examiner* — Philip Gabler
(74) *Attorney, Agent, or Firm* — Brooks Kushman P.C.

(57) ABSTRACT

The present invention relates to a vehicle seat frame made of structural foam having an attachment flange for attaching to a vehicle, and vehicle seat assembly, and methods of making the same. In at least one embodiment, the vehicle seat assembly comprises a seat frame made of structural foam and having a main body portion and at least one attachment flange depending from the main body portion. The attachment flange is attachable to a vehicle floor pan via an interference fit. The attachment flange has a first density and the main body portion has a second density, less than the first density. The vehicle seat assembly further comprises a cushion supported on the frame. The cushion is softer than the seat frame. The vehicle seat assembly further comprises a trim material disposed over the cushion and the frame.

20 Claims, 3 Drawing Sheets

(56) References Cited

U.S. PATENT DOCUMENTS

| | | |
|---|---|---|
| 6,612,648 B1 | 9/2003 | Hashiguchi |
| 6,783,184 B2 | 8/2004 | DiBattista et al. |
| 6,838,155 B2 | 1/2005 | Cappucci et al. |
| 6,899,399 B2 | 5/2005 | Ali et al. |
| 7,134,730 B2 | 11/2006 | Flegal et al. |
| 7,270,376 B2 * | 9/2007 | Jackson ................... 297/452.24 |
| 2003/0162008 A1 | 8/2003 | Cappucci et al. |
| 2003/0215601 A1 | 11/2003 | Pedde et al. |
| 2004/0084937 A1 | 5/2004 | Berta |
| 2007/0035165 A1 | 2/2007 | Zahel |
| 2008/0018162 A1 * | 1/2008 | Galbreath et al. ....... 297/452.48 |
| 2008/0048474 A1 | 2/2008 | Pedde et al. |
| 2009/0066142 A1 | 3/2009 | Ventura et al. |
| 2009/0146472 A1 | 6/2009 | Galbreath et al. |

FOREIGN PATENT DOCUMENTS

| | | |
|---|---|---|
| DE | 19756252 U1 | 7/1987 |
| DE | 3823584 A1 | 1/1990 |
| DE | 9404946 U1 | 5/1994 |
| DE | 29612969 U1 | 9/1996 |
| DE | 29910294 U1 | 8/1999 |
| DE | 202005020421 U1 | 5/2006 |
| DE | 102008060993 A1 | 6/2009 |
| EP | 2123505 A1 | 11/2009 |
| JP | 2000085417 A | 3/2000 |

\* cited by examiner

VEHICLE SEATING FRAME, ASSEMBLY, AND METHOD OF MAKING

BACKGROUND OF THE INVENTION

1. Field of the Invention

The present invention relates to a vehicle seat frame made of structural foam having an attachment flange for attaching to a vehicle, and vehicle seat assembly, and methods of making the same.

2. Background Art

Most vehicles have a second, and in some case, a third row of seat assemblies. Generally speaking, most seat assemblies include three fundamental components: (a) a frame to support the seat assembly and mount it to a body, such as a vehicle floor pan; (b) a cushion, typically made of foam, to cover the frame; and (c) trim material to cover cushion and provide a durable surface for contact with a seat assembly occupant. Conventional vehicle seat assemblies typically involve the use of a metal frame and wires for securing the seating assembly to the vehicle. This adds relatively significant weight and complexity to the manufacturing process.

Accordingly, there is a need to provide a vehicle seat assembly which is structurally sound and comfortable, yet lighter and easier to manufacture than typical seat assemblies.

SUMMARY OF THE INVENTION

According to at least one aspect of the present invention, a vehicle seat assembly is provided. In at least one embodiment, the vehicle seat assembly comprises a seat frame made of structural foam and having a main body portion and at least one attachment flange depending from the main body portion. The attachment flange is attachable to a vehicle floor pan via an interference fit. The attachment flange has a first density and the main body portion has a second density, less than the first density. The vehicle seat assembly further comprises a cushion supported on the frame. The cushion is softer than the seat frame. The vehicle seat assembly further comprises a trim material disposed over the cushion and the frame.

In at least one embodiment, the main body portion comprises a minimum density region spaced from the attachment flanges and a transition region extending between the minimum density region and the attachment flange.

In yet another embodiment, the at least one attachment flange comprises a plurality of spaced apart attachment flanges, with the main body portion comprising at least one minimum density region spaced from the plurality of the attachment flanges, and the main body portion further comprising a plurality of transition regions, with each transition region extending between the at least one minimum density region and a respective one of the attachment flanges.

According to at least another aspect of the present invention, a vehicle seat frame component is provided. In at least one embodiment, the vehicle seat frame comprises a seat frame made of structural foam having a main body portion and at least one attachment flange depending from the main body portion. The attachment flange is attachable to a vehicle and has a first density. The main body portion has a second density, less than the first density. The frame has an upper surface capable of supporting a foam cushion.

In at least one embodiment, the structural foam comprises expanded polyolefin made of expanded polyolefin beads and the attachment flange has a first bead density and the main body portion has a second bead density, less than the first bead density.

According to at least another aspect of the present invention, a method of making a vehicle seat assembly is provided. In at least one embodiment, the method of making a vehicle seat assembly comprises providing a seat frame made of structural foam and having a main body portion and an attachment flange depending from the main body portion, wherein the attachment flange is attachable to a vehicle floor pan. The attachment flange has a first density and the main body portion has a second density, with the first density being greater than the second density. The varying densities being provided by introducing a first plurality of expanded polyolefin beads having a first bead density into a mold tool to form the attachment flange and introducing a second plurality of expanded polyolefin beads having a second bead density into the mold tool to form the main body portion. The method further comprises supporting a foam cushion on the frame and disposing a trim material over the cushion and the frame.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

Figure 1:
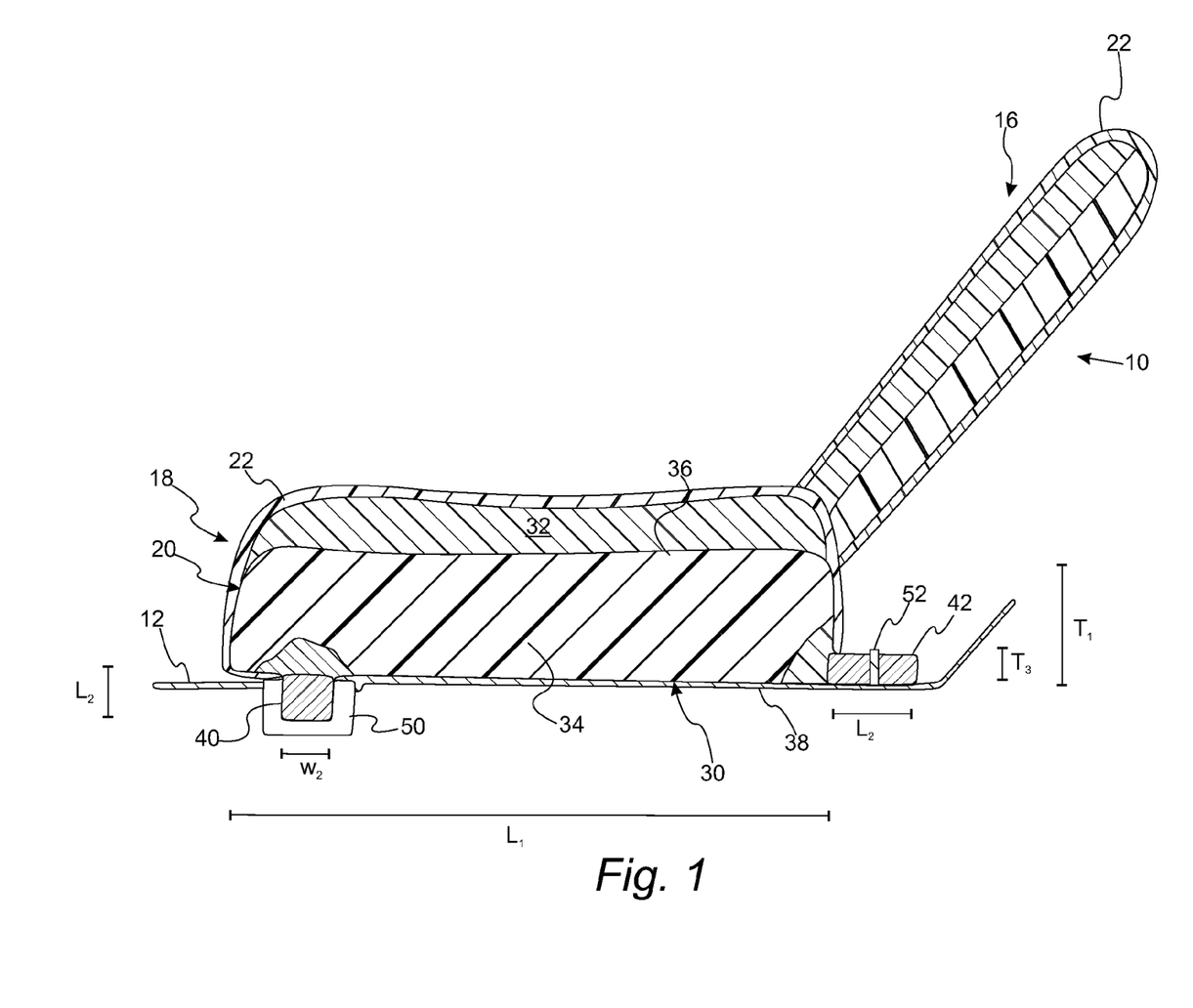
FIG. 1 is a schematic cross-sectional side view of a vehicle seat assembly in accordance with an embodiment of the present invention.
Figure 2:
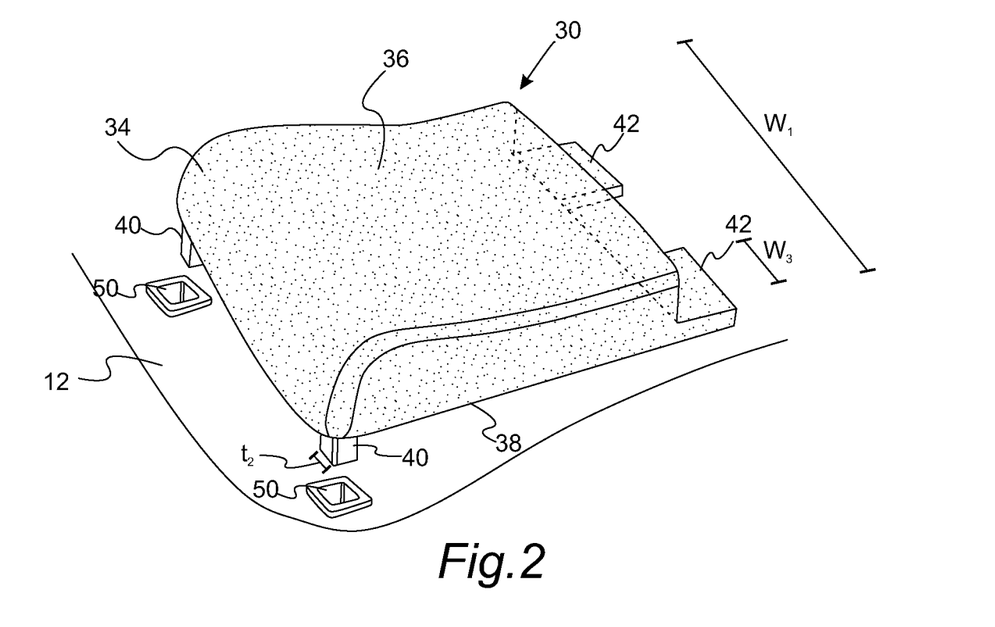
FIG. 2 is a schematic perspective view of the vehicle seat assembly illustrated in FIG. 1.

Referring now to the Figures, where like numerals are used to designate like structures throughout the drawings, a schematic vehicle seat assembly in accordance with at least one embodiment of the present invention is generally shown at 10 in FIG. 1. While the vehicle seat assembly 10 is illustrated in FIG. 1 to be a rear bucket seat assembly, it should be understood that the principles of the invention are applicable to other types of seat assemblies, such as bench, captain and other types of seat assemblies. Moreover, it should be understood that the principles of this invention are also applicable to other seat rows, such as the front and third rows of seats. It should also be understood that the principles of the present invention are applicable to other configurations where foam is a component such as backrests. Still further, it should also be understood that the principles of this invention are applicable to all types of vehicle seat assemblies as well as non-vehicle seat assemblies.

As shown in FIG. 1, the vehicle seat assembly 10 is supported on a vehicle floor pan 12. The vehicle seat assembly 10 may be secured in any suitable manner to the floor pan 12. In certain embodiments, the vehicle seat assembly 10 may be secured to parts of the vehicle other than, or in addition to, the floor pan, such as a vehicle body frame (not shown), and/or other interior components, such as a center console or a rear package tray.

The illustrated vehicle seat assembly 10 includes a seat back, generally indicated at 16, and a lower seat assembly, generally indicated at 18. In at least the illustrated embodiment, the seat back 16 and the lower seat assembly 18 each have a cushion composite 20 covered by a trim material 22. In the illustrated embodiment, the cushion composite 20 in both the seat back 16 and the lower seat assembly 18 are made of the same construction. However, it should be understood that the cushion composite 20 for the seat back 16 can differ from the cushion composite 20 of the lower seat assembly 18. Likewise, it should be understood that the trim material 22 for the seat back 16 can differ from the trim material 22 for the lower seat assembly 18.

As can best be seen in FIG. 1, the cushion composite 20 includes a structural polymeric frame 30, in at least the illustrated embodiment, and a cushion 32 that is disposed over the structural frame 30. The cushion composite 20 may optionally include a comfort pad (not shown) that is disposed over the cushion 32. As will be explained further below, in at least one embodiment, each of the frame member 30, the cushion 32 and, if present, the optional comfort pad, cooperate with, and in some embodiments are secured to, each other in a manner such that they are relatively easily separable for recycling at end of use. If any of the frame 30, the cushion 32, and optional comfort pad are secured to another, suitable securement methods can be used, such as the use of interference fits, surface tension resistance modifications, clips and/or adhesive, in such a manner as to allow for relatively easy separation of the components.

The polymeric frame 30 has a main body portion 34 having an upper surface 36 and a lower surface 38. In the illustrated embodiment, the frame 30 includes a pair of spaced apart attachment flanges 40 that depend downwardly from the lower front surface 38 of the main body portion 34 and a pair of spaced apart rearwardly extending attachment brackets 42 that extend rearwardly from the back rear surface 38 of the main body portion 34.

In at least one embodiment, the main body portion 34 has an average thickness t1, of 20 to 400 mm, in another embodiment of 100 to 325 mm, and in yet another embodiment of 175 to 275. In at least one embodiment, the main body portion 34 has a length l1, of 400 to 1400 mm, in another embodiment of 550 to 1200 mm, and in yet another embodiment of 750 to 1100 mm. In at least one embodiment, the main body portion 34 has an average width w1 of 300 to 600 mm, in another embodiment of 350 to 550 mm, in yet another embodiment of 400 to 500 mm.

In at least one embodiment, the front attachment flanges 40 each independently have a length l2 of 10 to 30 mm, in another embodiment of 12 to 25 mm, and in yet another embodiment of 15 to 23 mm. In at least one embodiment, the front attachment flanges 40 each independently have a width w2 of 20 to 70 mm, in another embodiment of 25 to 60 mm, and in yet another embodiment of 30 to 55 mm. In at least one embodiment, the front attachment flanges 40 each independently have an average thickness t2 of 20 to 70 mm, in another embodiment of 25 to 60 mm, and in yet another embodiment of 30 to 55 mm.

In at least one embodiment, the rear attachment brackets 42 each independently have an average thickness t3 of 2 to 40 mm, in another embodiment of 5 to 30 mm, and in yet another embodiment of 10 to 25 mm. In at least one embodiment, the rear attachment brackets 42 each independently have an average length l3 of 20 to 90 mm, in another embodiment of 30 to 80 mm, and in yet another embodiment of 40 to 70 mm. In at least one embodiment, the rear attachment brackets 42 each independently have a width w3 of 20 to 70 mm, in another embodiment of 25 to 60 mm, and in yet another embodiment of 30 to 55 mm.

While the illustrated embodiment depicts a pair of attachment flanges 40 depending from the lower front surface 38 and a pair of attachment brackets 42 extending from the back rear surface 38 of the frame 30, it should be understood that the numbers, locations, sizes and shapes of the attachment flanges 40 and brackets 42 can vary as desired.

In the illustrated embodiment, the vehicle floor pan 12 is illustrated to have corresponding recesses 50 and slots 52 for receipt of the flanges 40 and brackets 42, respectively, of the frame 30 for securing the frame 30, and thus the seat assembly 10, to the vehicle. The attachment flanges 40 and brackets 42 can be secured within the recess 50 and slots 52 in any suitable manner. Some exemplary suitable attachment manners include, among others, via an interference fit, adhesive, clips, etc. Moreover, it should be understood that the slots 52 could be omitted so that the rear attachment brackets 42 are secured to the vehicle floor pan 12 in another manner, or could just rest on the floor pan. Moreover, the rear attachment brackets 42 could even be omitted such that the front attachment flanges 40 are the only, or primary, securing the frame 30 to the vehicle.

The structural frame 30 can be made of any suitable structural foam material. In at least one embodiment, suitable structural materials will have a rigidity and/or density that is higher than conventional polyurethane foam. For instance, the structural foam may having a hardness that is in at least one embodiment 50% to 300% higher than that of conventional polyurethane foam, and in other embodiments, that is 150% to 225% higher than that of conventional polyurethane foam. In at least one embodiment, suitable structural foam materials have a density of at least 1.0 pounds per cubic foot (pcf), and less than 6.0 pcf, while the other embodiments of 1.75 to 4.5 pcf. Density of the structural foam material can be measured in accordance with ASTM test method No. D3574.

In at least one embodiment, suitable structural materials will have a hardness at least 75% deflection of 600 to 1000 $N/mm^2$, in at least another embodiment of 650 to 900 $N/mm^2$, and in at least another embodiment of 750 to 900 $N/mm^2$. Hardness can be measured by ASTM test method No. D3574. In at least one embodiment, suitable structural materials will have a compression strength of 20 to 100 psi, in at least another embodiment of 30 to 80 psi, and in at least another embodiment of 35 to 65 psi, as measured in accordance with ASTM test method No. D3574.

In at least one embodiment, the frame 30 has multiple zones that vary by structural characteristic, such as density, compressive strength, tensile strength, and/or flexural strength. At least one embodiment of the various zones of the structural polymeric frame 30 is shown schematically in FIG. 3.

Figure 3:
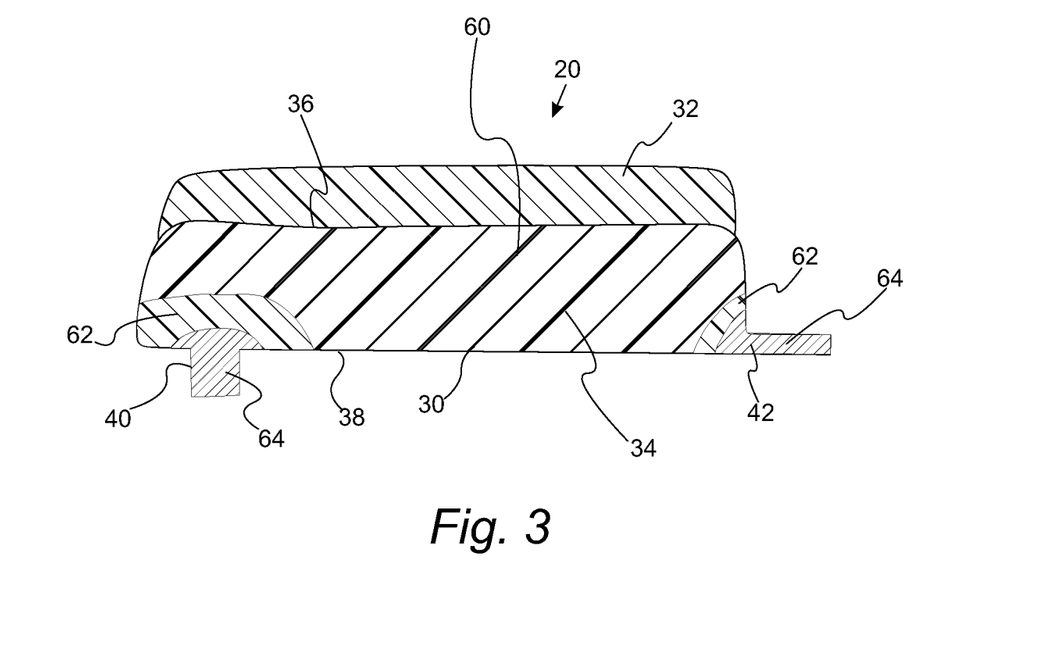
FIG. 3 is a view similar to FIG. 1 illustrating certain details of an embodiment of the present invention.

In at least one embodiment, the attachment flanges 40 and the attachment brackets 42 generally have the same structural characteristics as each other. A first region illustrating the structural characteristics of each of the attachment flanges and brackets 40 and 42 is indicated at 64. In at least one embodiment, the first region comprises essentially all of the respective attachment flange or bracket 40 and 42. It should be understood that each first region can also independently be less than or more than essentially all of a respective attachment flange or bracket 40 and 42. For instance, in at least certain embodiments, each first region can independently be 0.25 to 20%, based on volume, less or more of a respective attachment flange or bracket 40 and 42, in other embodiments, 0.5 to 10 percent, and in yet other embodiments 0.1 to 5 percent.

The main body portion 34 of the frame 30 generally has lower structural characteristics than the attachment flanges and brackets 40 and 42. As shown in the illustrated embodiment, the structural characteristics of the main body portion vary depending generally upon the distance from the attachment flanges and brackets 40 and 42. The majority of the main body portion 34 of the frame 30 comprises a second region, as indicated at 60. As shown in the illustrated embodiment, the main body portion 34 of the frame also has transition regions, as indicated at 62, with each extending between a respective first region 64 and the second region 60. While only two transition regions 62 are shown in FIG. 3, it should be understood that the number and location of transition regions 62 can vary as needed. The transition region 62 generally has higher structural characteristics than the second region 60, but less than the first region 64. In at least one embodiment, each transition region 62 can independently comprise 0.1 to 7.5 based on volume, of the main body portion 34 of the frame, and in another embodiment 0.25 to 10% and in yet another embodiment 0.5 to 2.0%, with the second region 60 comprising the remainder of the main body portion of the frame.

In at least one embodiment, the density of the first region 64 is 3.8 to 11.1 pcf, in another embodiment 3.8 to 5.6 pcf, and in yet another embodiment is 4.2 to 5.0 pcf. In at least one embodiment, the compression strength (at 75% strain) of the first region 64 is 1.0 to 2.25 MPa, and in another embodiment 1.25 to 2.0 MPA. In at least one embodiment, the tensile strength of the first region 64 is 0.62 to 1.10 MPa, and in another embodiment is 0.7 to 0.9 MPa. In at least one embodiment, the flexural strength of the first region 64 is 0.5 to 1.30 MPa, and in another embodiment 0.70 to 1.10 MPA.

Density, compressive strength (at 75% strain), tensile strength, and hardness can all be measured in accordance with ASTM test method No. D3574. Flexural strength can be measured in accordance with ASTM test method No. D790.

In at least one embodiment, the density of the second region 60 is 1.0 to 1.9 pcf, and in another embodiment is 1.2 to 1.75 pcf. In at least one embodiment, the compression strength (at 75% strain) of the second region 60 is 0.25 to 0.40 MPa, and in another embodiment 0.28 to 0.38 MPA. In at least one embodiment, the tensile strength of the second region 60 is 0.2 to 0.37 MPa, and in another embodiment is 0.25 to 0.35 MPa. In at least one embodiment, the flexural strength of the second region 60 is 0.15 to 0.37 MPa, and in another embodiment 0.20 to 0.33 MPA.

In at least one embodiment, the density of the transition region 62 is 2.0 to 3.75 pcf, and in another embodiment is 2.25 to 3.0 pcf. In at least one embodiment, the compression strength (at 75% strain) of the transition region 62 is 0.41 to 0.90 MPa, and in another embodiment 0.55 to 0.80 MPa. In at least one embodiment, the tensile strength of the transition region 62 is 0.38 to 0.61 MPa, and in another embodiment is 0.42 to 0.50 MPa. In at least one embodiment, the flexural strength of the transition region 62 is 0.38 to 0.65 MPa, and in another embodiment 0.45 to 0.60 MPA.

In at least one embodiment, the structural frame 30 comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, and the like.

In at least one particular preferred embodiment, the EPO is expanded polypropylene (EPP) and its copolymers with ethylene, propylene and butylene. Any suitable EPP may be used, however in at least one embodiment, suitable EPP's include, but are not limited to, ARPRO® EPP available from JSP International and EPP available from Kaneka.

Expanded polyolefins can be prepared by an expanded bead forming process in which relatively small uniform beads of polymer are produced, containing a gas which is utilized to effect blowing during the forming process. The most commonly used gas is air although other gases including low boiling point liquids which produce gases at the molding temperatures may be used. Suitable gases include, but are not limited to air, nitrogen, carbon dioxide, pentene and the like.

Figure 4:
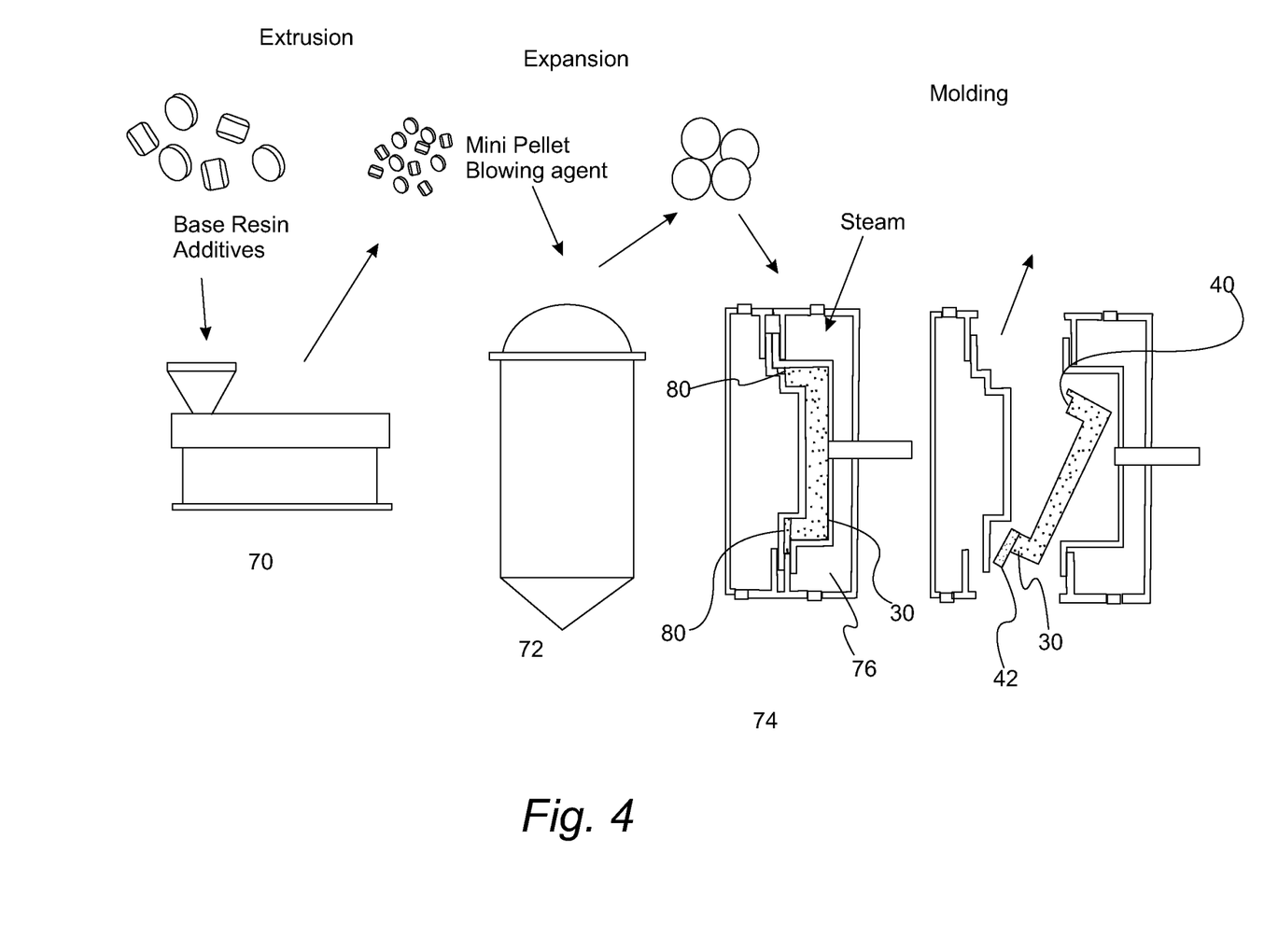
FIG. 4 is a schematic flow diagram illustrating a manner of making a component of the vehicle seat assembly in accordance with an embodiment of the present invention.

The expanded polyolefin can be formed into the structural frame via any suitable forming process, such as exposing to steam in a mold, e.g., "steam chest molding." Making reference to FIG. 4, an exemplary method of forming the frame is illustrated. The polyolefin is provided, preferably by extrusion into mini pellets as shown in step 70, and later formed into beads as shown in step 72. The beads are then placed into the formed frame 30 in step 74. In this step, a molding tool 76 is provided and the beads are disposed therein. Steam is introduced into the tool 76 cause the beads to adhere to each other to form the expanded polyolefin structural frame 30.

To form the flanges 40, the brackets 42 and, if present, the transition regions 62, various methods could be employed. In at least one embodiment, separating beads of various densities and/or sizes can provide the different regions of the frame 30 having different structural characteristics. In at least one embodiment, the beads used to form the first region(s) 64 have a bead density that is more than the beads used to form the main body portion 34 of the frame 30. Moreover, in at least one embodiment, the beads used to form the transition region(s) 62 have a bead density that is more than the beads used to form the second region 60 but less than the beads to form the first region(s) 64. Various methods for separating beads of different densities and/or sizes can be employed. For instance, plates 80 are schematically shown to maintain expanded beads of various densities and/or sizes separate to form the separate regions, i.e., the first, second, and if present, the transition regions 64, 60, and 62. Alternatively, other separation techniques could be employed. For instance the different expanded bead densities and/or sizes could be separated by doing separate fills of the differing expanded bead densities and/or sizes via a gravity fill. Also, a vacuum or static electricity can be employed to separate the various bead densities and/or sizes.

Moreover, to vary the density, strength and hardness of the regions, multiple characteristics of the molded part can be varied. For instance, as discussed above, the incoming beads can be different sizes leading to a difference in the number of interfaces (e.g., bead adhesion bond lines) between the beads, thereby increasing the strength and hardness. Also, the density of the beads before molding can vary, as can the density of the beads making up the various regions of the molded part. For instance, for each region, beads with a different density (and also may be size) can be disposed in various regions of the molding tool. The higher density regions exterior to the part are usually designed to be the strongest.

In other embodiments, other materials can be added to the bead mixture, such as non-expanded pure polypropylene (such amorphous polypropylene having a density of 860 grams/liter, crystalline polypropylene having a density of 950 grams/liter and blends thereof), recycled polypropylene recovered from EPP parts, virgin polypropylene and other polymers to alter the densities of the regions. These materials can then rest between the beads, enhancing the adhesion characteristics and varying strength and hardness of the regions.

Additionally, the time of exposure of the part in the tool to the steam heated during molding can vary, and use of other means, such as vacuum and mechanical pressure (hydraulic and pneumatic), can be used to increase the internal tool pressure.

In at least one embodiment, the formed beads in the first region(s) 64 have a bead density of 60 to 180 grams/liter, in other embodiments of 60 to 90 grams/liter, and in other embodiments 65 to 82 grams/liter. In at least one embodiment, the formed beads in the second region 60 have a bead density of 10 to 59 grams/liter, and in other embodiments 25 to 45 grams/liter.

When the main body portion 34 has a transition region(s) 62, in at least one embodiment, the formed beads in the second region 60 have a bead density of 10 to 29 grams/liter, and in other embodiments 15 to 25 grams/liter. In at least one embodiment, the formed beads in the transition region(s) 62 have a bead density of 30 to 59 grams/liter, and in other embodiments 35 to 50 grams/liter.

The cushion 32 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574. In at least one embodiment, suitable cushion materials will have a hardness at 75% deflection of 175 to 400 N/mm$^2$, in other embodiments of 225 to 350 N/mm$^2$, and in yet other embodiments of 275 to 325 N/mm$^2$. Hardness of the cushion can be measured by ASTM test method No. D3574. In at least one embodiment, suitable cushion materials will have a hysteresis of 18 to 30 KPa, in another embodiments of 20 to 28 KPa, and in yet other embodiments of 23-26 KPa. Hysteresis of the cushion material can be measured by ASTM test method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In other embodiments, the cushion material could be a non-woven material, such as polyester, nylon, or natural fibers. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems, and Dow Chemical. Any suitable soy-based polyurethane may be used, however in at least one embodiment, suitable soy-based polyurethanes include, but are not necessarily limited to those available from Woodbridge Foam and Renosol. The cushion 32 can be any suitable size and shape, however, in at least one embodiment, the cushion 32 has an average thickness of 20 to 100 mm, and in at least another embodiment of 30 to 70 mm, and in still yet other embodiments of 40 to 60 mm.

If a comfort pad is provided, it can comprise any suitable comfort layer or pad and can be made of any suitable material that provides good hand feel and soft resilience as the seat assembly 10 is deflected during use. A comfort pad is optionally provided when the cushion 32 has a density above 1.25 pcf, as measured according to ASTM test method No. D3574 and/or a hardness above 300 N/mm$^2$, as measured according to ASTM test method No. D3574 at a compression of 50%. A comfort pad can comprise a sheet of relatively soft material, such as a low hardness foam or a pad of non-woven fibrous materials or a polyester, nylon, or non-woven fiber pad. It should be understood that the structural frame 30, the cushion 32, and, if present, the comfort pad can have any suitable configuration, shape and size.

As discussed above, the vehicle seat assembly 10 also includes trim material 22 which is adapted to engage the cushion composite 20 in a covering relationship. The trim material 22 may include any material known in the art. By way of example, some of the known materials include cloth, leather or polymers of sufficient quality and thickness for use in seat trim applications. Polymer trim materials may include a flexible close cell polymer skin material such as polyvinyl, polyvinyl chloride (PVC), polyester, nylon, thermoplastic olefin (TPO) or thermoplastic urethane (TPU). Additional materials for use as trim material 22, may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass, nylon, polyester or natural fibers may be applied to the foam backing or back of the trim material 22 for increase in strength without increasing rigidity.

In at least certain embodiments, the frame 30, the cushion 32, if present, the comfort pad, and the trim material 22 are configured so that they can be easily assembled and disassembled to facilitate assembly and end of line disassembly for recycling. In at least one embodiment, the frame 30 and the cushion 32 are not secured to each other by any suitable mechanical fastening. In this embodiment, the cushion 32 is placed over the frame 30 and both are held together by the overlying trim material 22. In other embodiments, the frame 30 and cushion 32 can have mechanical fastening components, such as adhesive and/or clips, to hold onto each other.

In keeping with the environmentally friendly considerations of the vehicle seat assembly 10, any adhesive layer that is used should be compatible with one or more of the frame 30 and cushion 32 for ease of recycling. For example, a polyester-based adhesive can be used to adhere polyester trim 22 to a non-woven polyester cushion 32 thereby maintaining common polymer content in that layer. Similarly if attachment clips are used in a polyurethane cushion 32, they could be molded out of thermoplastic polyurethane (TPU) to again preserve commonality of polymer content in the layer. When separated, the TPU clips could remain in the support polyurethane layer.

As discussed above, the vehicle seat assembly 10 of the present invention is readily recyclable. In this regard, the frame 30 and cushion 32 can be easily separated from each other and from the trim material 22 in a relatively easy and straightforward fashion. For instance, the frame 30 and cushion 32 can be separately recycled without any difficulty and recycled in separate streams.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
a unitary and integrally formed seat frame made of structural foam having a hardness at 75% deflection of 600 to 1,000 N/mm$^2$ as measured by ASTM test method D3574, the seat fame having a main body portion and at least one attachment flange depending from the main body portion, the attachment flange attachable to a vehicle floor pan via an interference fit, the attachment flange having a first density and the main body portion having a second density, the first density being greater than the second density;
a resilient foam cushion supported on the unitary and integrally formed seat frame made of structural foam, the cushion being softer than the seat frame and having a hardness at 75% deflection of 175 to 400 N/mm$^2$ as measured by ASTM test method D3574; and
a trim material disposed over the cushion and the frame.

2. The vehicle seat assembly of claim 1, wherein the seat frame is one-piece and the main body portion of the seat frame is integrally formed with the attachment flange and wherein the main body portion comprises a minimum density region spaced from the attachment flange and a transition region extending between the minimum density region and the attachment flange.

3. The vehicle seat assembly of claim 2, wherein the transition region comprises a third density being less than the first density and greater than the second density, wherein the at least one attachment flange comprises a plurality of spaced apart attachment flanges depending downwardly to be receivable in a respective recess of a vehicle floor pan.

4. The vehicle seat assembly of claim 3, wherein the frame further comprises a plurality of attachment brackets extending rearwardly from the main body portion to cooperate with the floor pan, and wherein the first density comprises 3.8 to 11.1 pcf, the second density comprises 1.0 to 1.8 pcf and the third density comprises 1.9 to 3.75 pcf, and wherein the flanges and brackets are integral with the main body portion, and the flanges, the brackets and the main body portion are made in the same molding tool, and wherein the structural foam has a hardness of 50% to 300% higher than the hardness of the resilient foam.

5. The vehicle seat assembly of claim 2, wherein the structural foam comprises expanded polyolefin made of expanded polyolefin beads and the attachment flange has a first bead density, the minimum density region has a second bead density, less than the first bead density, and the transition region has a third density bead less than the first bead density and greater than the second bead density.

6. The vehicle seat assembly of claim 5, wherein the first bead density is 60 to 180 grams/liter, the second bead density is 10 to 29 grams/liter, and the third bead density is 30 to 59 grams/liter.

7. The vehicle seat assembly of claim 2, wherein the transition region comprises a third density being less than the first density and greater than the second density, wherein the at least one attachment flange comprises a plurality of spaced apart attachment flanges integral with, and depending downwardly from, the main body portion to be receivable in a respective recess of a vehicle floor pan, and wherein the cushion comprises a foam cushion, wherein the frame further comprises a plurality of attachment brackets extending rearwardly from the main body portion to cooperate with the floor pan, and wherein the first density comprises 3.8 to 11.1 pcf, the second density comprises 1.0 to 1.8 pcf and the third density comprises 1.9 to 3.75 pcf, and wherein the flanges and brackets are integral with the main body portion, and the flanges, the brackets and the main body portion are made in the same molding tool.

8. The vehicle seat of claim 1, wherein the at least one attachment flange comprises a plurality of spaced apart attachment flanges having the first density, wherein the main body portion comprises at least one minimum density region spaced from the plurality of the attachment flanges, and the main body portion further comprising a plurality of transition regions, with each transition region extending between the at least one minimum density region and a respective one of the attachment flanges, wherein the transition region comprises a third density being less than the first density and greater than the second density.

9. The vehicle seat assembly of claim 1, wherein the first density comprises 3.8 to 11.1 pcf.

10. The vehicle seat assembly of claim 9, wherein the second density comprises less than 3.8 pcf.

11. The vehicle seat assembly of claim 10, wherein the second density comprises 1.0 to 3.25 pcf.

12. The vehicle seat assembly of claim 1, wherein the structural foam comprises expanded polyolefin made of expanded polyolefin beads and the attachment flange has a first bead density and the main body portion has a second bead density lower than the first bead density, and the cushion is made of polyurethane.

13. The vehicle seat assembly of claim 12, wherein the first bead density is 60 to 180 grams/liter and the second bead density is 10 to 59 grams/liter.

14. A vehicle seat frame component comprising:
an integrally formed seat frame made of structural foam, the seat fame having a main body portion and at least one attachment flange depending from the main body portion, the attachment flange attachable to a vehicle, the attachment flange having a first density and the main body portion having a second density, the first density being greater than the second density, the frame having an upper surface capable of supporting a foam cushion, the structural foam comprising expanded polyolefin made of expanded polyolefin beads, the attachment flange having a first bead density and the main body portion having a second bead density, less than the first bead density, the seat frame being one-piece and the main body portion comprising a minimum density region spaced from the attachment flanges and a transition region extending between the minimum density region and the attachment flange, and wherein the at least one attachment flange comprises a plurality of spaced apart attachment flanges, wherein the main body portion comprises at least one minimum density region spaced from the plurality of the attachment flanges, and the main body portion further comprising a plurality of transition regions, with each transition region extending between the at least one minimum density region and a respective one of the attachment flanges.

15. The vehicle seat frame component of claim 14, the minimum density region having the second bead density and the transition region having a third bead density less than the first bead density and greater than the second bead density.

16. The vehicle seat frame component of claim 14, wherein the first density comprises 3.8 to 11.1 pcf.

17. The vehicle seat frame component of claim 14, wherein the second density comprises 1.0 to 3.25 pcf.

18. A method of making a vehicle seat assembly, said method comprising:

forming an integrally formed seat frame made of structural foam in a first mold and having a main body portion and an attachment flange depending from the main body portion, the attachment flange attachable to a vehicle floor pan, the attachment flange having a first density and the main body portion having a second density, the first density being greater than the second density, the varying densities being provided by introducing a first plurality of expanded polyolefin beads having a first bead density into a mold tool to form the attachment flange and introducing a second plurality of expanded polyolefin beads having a second bead density into the mold tool to form the main body portion, removing the seat frame from the first mold;

forming a foam cushion made in a second mold, removing the foam cushion from the second mold and supporting the foam cushion on the seat frame; and     disposing a trim material over the foam cushion and the seat frame.

19. The method of claim 18 further comprising providing an vehicle floor pan and securing the attachment flange of the seat frame to the floor pan, and wherein the attachment flange is secured to the floor pan via an interference fit, and the seat frame having a hardness at 75% deflection of 600 to 1,000 $N/mm^2$ as measured by ASTM test method D3574 and the foam cushion having a hardness at 75% deflection of 175 to 400 $N/mm^2$ as measured by ASTM test method D3574.

20. The method of claim 18, wherein the structural foam comprises expanded polyolefin made of expanded polyolefin beads and the attachment flange has a first bead density and the main body portion has a second bead density lower than the first bead density, and the cushion is made of resilient polyurethane foam.

* * * * *